Jan. 22, 1957  F. A. ROSS  2,778,633
MACHINE FOR CUTTING, FOLDING AND PRESSING LABELS
Filed Oct. 22, 1953  7 Sheets-Sheet 1

INVENTOR.
FRANK A. ROSS,
BY Bruce B. Clyman
ATTORNEY

Jan. 22, 1957     F. A. ROSS     2,778,633
MACHINE FOR CUTTING, FOLDING AND PRESSING LABELS
Filed Oct. 22, 1953     7 Sheets-Sheet 2

INVENTOR.
FRANK A. ROSS
BY Bruce B. Clyman
ATTORNEY

Jan. 22, 1957 — F. A. ROSS — 2,778,633
MACHINE FOR CUTTING, FOLDING AND PRESSING LABELS
Filed Oct. 22, 1953 — 7 Sheets-Sheet 4

INVENTOR.
FRANK A. ROSS
BY Bruce B. Clyman
ATTORNEY

INVENTOR.
FRANK A. ROSS
BY Bruce B. Clyman
ATTORNEY

United States Patent Office 2,778,633
Patented Jan. 22, 1957

2,778,633

MACHINE FOR CUTTING, FOLDING AND PRESSING LABELS

Frank A. Ross, Ross Township, Allegheny County, Pa., assignor to Leon Hershaft, Yonkers, N. Y.

Application October 22, 1953, Serial No. 387,761

8 Claims. (Cl. 270—61)

The present invention relates to a machine for automatically cutting, folding and pressing fabric labels and, more particularly, it relates to a machine for automatically cutting, folding and pressing fabric labels, which machine is able to sever a fabric label from the end of a strip of such labels, fold the ends of the severed label underneath the body of the label, then permanently crease these folded ends with a heated pressing means, and finally convey the pressed label to a label stacking mechanism.

Heretofore, automatic label cutting, folding and pressing machines have been provided which employ heated means that press each folded label a plurality of times in order to give it a permanent crease. Unfortunately, this repeated pressing of the label with a heated pressing means often results in scorching of the labels. In addition, the character of the fabric may be such that the label will not always lie flat after the first pressing step, which is generally insufficient to attain a permanent crease. When this occurs, there is a good chance that the folded label will be creased along a line other than the fold line. Such a label can very easily jam the stacking mechanism.

In order to overcome these objections and difficulties, I have provided an automatic label cutting, folding and pressing machine having a pressing means which can permanently crease a folded label with one pressing step. An auxiliary pressure means is incorporated in my novel pressing means to insure the permanence of the crease.

Furthermore, my novel pressing means is so shaped that it is able to convey the permanently creased label to a stacking mechanism without further treatment of the folded ends of the label. I accomplish this by providing conveying channels in the pressing means. The folded ends of the labels are able to lie freely in these channels as the labels are conveyed along to the stacking mechanism.

Although my novel machine has many embodiments not present in other machines of the same character, it is the principal object of the present invention to provide an automatic label cutting, folding and pressing machine having an automatic pressing means which is able to crease permanently in one pressing step the folded ends of a label.

The main advantage of the novel pressing means employed in my machine is that it is able to crease the folded labels without scorching them. This eliminates the need of an additional operation to search out and discard the scorched labels.

Another advantage of my invention is that the labels, regardless of the quality of the fabric, are properly creased for proper feeding to the stacking mechanism.

Other objects and advantages of the present invention will become more apparent as it is described in detail below with particular reference to the accompanying drawings wherein.

Briefly describing the present invention, there is provided a frame to support the working parts of the label cutting, folding and pressing machine. An auxiliary frame member is slidably connected to one end of the frame member. This auxiliary frame member carries half of the folding and pressing mechanism. Since the auxiliary frame member is slidable, it may be adjusted to accommodate labels of different length.

A reel carrying a rolled strip of printed fabric labels is mounted at the end of the frame opposite the auxiliary frame member. The free end of the strip lies face up in a channel which extends across the front of the machine to a reciprocating knife. A feed arm moves the strip intermittently forward in the channel to the reciprocating knife. A second arm, which I call the pull-back arm, pulls the strip backwardly a short distance after each forward movement. The pull-back arm is electrically controlled by means of a photoelectric cell disposed above the strip near the knife, which cell governs the amount of backward movement of the strip. To insure that each label is properly cut, an indicia is provided on the strip between each label. In operation, the strip is overfed to the knife and then pulled backwardly by the pull-back arm. The photo-electric cell is operative only on the backward movement of the strip. As the indicia adjacent the label to be cut passes under the photo-electric cell, the cell will cause the pull-back arm to release its hold on the strip so that the strip is stationary. Thus, the end label is in proper position for severance.

After the end label has been severed, it is seized by the flat transfer jaws of a reciprocating transfer mechanism located adjacent the knife and moving in a direction transverse to the unsevered strip of labels. The transfer jaws carry the severed label into the folder mechanism where it is folded and given a preliminary crease.

The folder mechanism comprises a pair of opposing and vertically movable folder carriages. One folder carriage is supported on the end of the frame member and the other is supported on the auxiliary frame member. A creasing slide is mounted on the face of each folder carriage. These creasing slides are in opposed relation and have a vertical movement independent of that of the folder carriages. Below each creasing slide and in opposed relation to each other are a pair of horizontally movable tucker slides. Each tucker slide is carried within the body of its corresponding folder carriage. The folder carriages are so located that the transfer jaws will carry each severed label to a point between opposing creasing and tucker slides.

When the severed label is brought into the folder mechanism by the transfer jaws, the folder carriages will move downwardly. As the folder carriages descend, the tucker and creasing slides cooperate to bend the ends of the severed label underneath the lower transfer jaw, which is wider than the upper transfer jaw. The transfer jaws then release their grip on the label and retract to their initial position to receive the next label. The folded label is now held by the cooperative action of the tucker and creasing slides, which action has resulted in giving the label a preliminary crease. The folder carriages then ascend bringing the folded label to a level where it can be seized by a pair of reciprocating jaws which carry it to the pressing mechanism.

The pressing mechanism comprises a pair of reciprocating jaws disposed between a pair of parallel pressing units. The pressing units are mounted on the frame and auxiliary frame member and are in line with the folder carriages. Each pressing unit consists of a stationary heater bar and a vertically movable flat presser bar disposed underneath the heater bar. The underbody of the front portion of each heater bar is a flat surface which is periodically engaged by the flat upper surface of the presser bar. These are the pressing surfaces. Each folded label is delivered by the reciprocating jaws from the folder mechanism into the pressing mechanism in such a manner that the folded ends of the label lie between the pressing surfaces of the heater bars and presser bars. As the reciprocating jaws open and advance to seize the next label, the pressing units close thereby giving the folded ends of the label a permanent crease. No further pressing operation is applied to the label. The remainder of the underbody of each heater bar has a conveying channel extending its length parallel to the reciprocating jaws. The pressed ends of the labels are adapted to move in these channels.

The reciprocating jaws are rather elongated so that they can grip several labels at a given time along their length. As the jaws advance to seize another label from the folder mechanism, they also close upon the label just permanently creased and carry it further back into the pressing units, which are now open. When next the pressing units close, they seize only the unfolded portion of the label, the folded ends remaining in the conveying channels. This procedure is repeated until the label eventually reaches the stacking mechanism. All the time that the label is being conveyed to the stacking mechanism, the folded ends will move freely in the conveying channels.

The strip feeding mechanism, folder mechanism, pressing mechanism and stacking mechanism are all arranged so that they will actuate in timed relation to each other. When one label is being severed, another is being folded, another is being pressed and still others are being conveyed to the stacking mechanism.

*Strip feeding mechanism*

Figure 1:
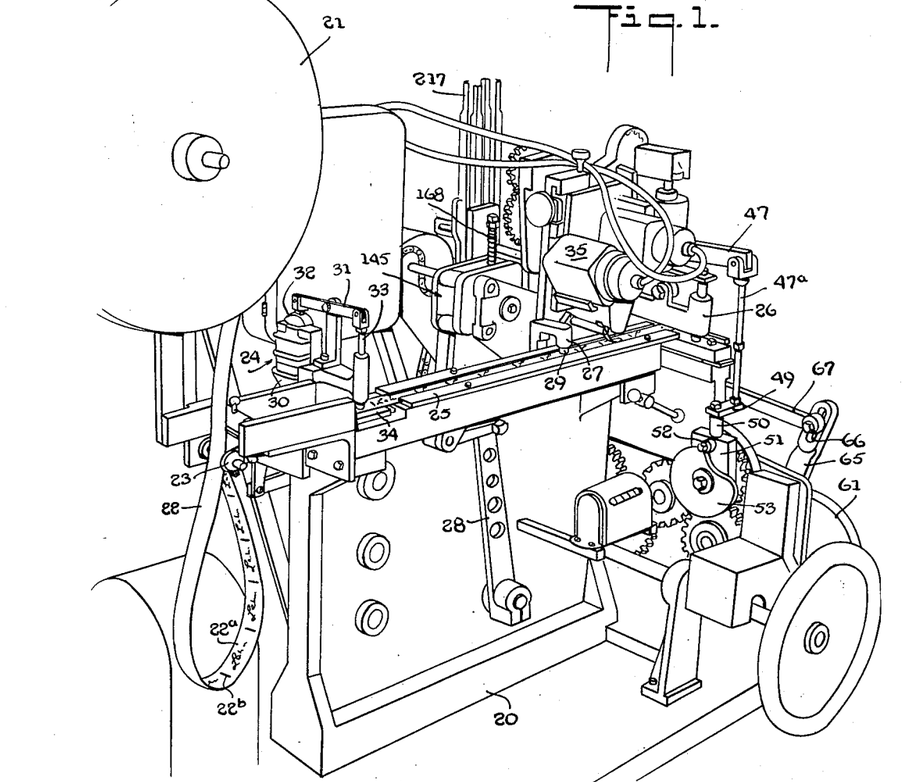
Figure 1 is a front view in perspective of my automatic label cutting, folding, and pressing machine.

With particular reference to Figure 1, there is shown a label cutting, folding and pressing machine of the present invention comprising a frame 20 having a reel 21 mounted at one end thereof. The reel 21 holds a rolled strip 22 of printed fabric labels 22a. Registering indicia 22b are located on the strip 22 between each label 22a. The label strip 22 passes from the reel 21 through guide member 23 located at the end of the frame 20 and then extends beneath the pull-back mechanism 24. It continues across the flat top 20a of the frame 20 and between the parallel guide rails 25. These guide rails 25, which are mounted near the front edge of the frame 20, lead the free end of the strip 22 underneath the vertical knife 26.

A feed arm 27 is located above the strip 22 at a point between the knife 26 and pull-back mechanism 24. The feed arm 27 reciprocates parallel to the strip 22 and is connected through suitable link members to the oscillating lever 28, which is driven through power transmitted from the main power shaft. A finger 29 depends from the feed arm 27. The feed arm 27 reciprocates in such a manner that the finger 29 will engage the strip 22 on its forward stroke only, at which time it pushes the strip toward the knife 26. The strip 22 is unaffected by the return stroke of the feed arm 27. Any of several well known arrangements between the feed arm 27 and oscillating lever 28 may be provided in order to attain the above described feed action. Since such arrangements are well known in the art, they need not be discussed here.

At a point just before the entrance to the rails 25 there is provided the pull-back mechanism 24 which serves to pull the strip 22 slowly backwards a very short distance after each forward feed of the strip to the knife 26. The pull-back mechanism 24 comprises a reciprocating carriage 30 which carries a yoke 31. One end of the yoke 31 is connected to a solenoid 32 and the other end is connected to a spring actuated plunger arm 33. Both solenoid 32 and plunger arm 33 reciprocate with the carriage 30 in a direction parallel to the strip 22. Normally, the plunger arm 33 is spring urged downwardly so that it bears on the flat bed 34 over which the label strip 22 passes. When the solenoid 32 is energized, the plunger arm 33 will be up and out of engagement with the flat bed 34. The solenoid 32 is always energized on the forward movement of the carriage 30 so that the plunger arm does not engage the strip 22.

A photo-electric cell 35 scans the unsevered end label 22a from a position adjacent the knife 26 and above the label strip 22. The photo-electric cell 35 is adjusted electrically through conventional timing and switch means (not shown) so that when the strip 22 is being fed forwardly to the knife 26, the cell does not operate. However, when the label strip 22 is being pulled backwardly, the photo-electric cell 35 scans the indicia 22b thereon so that the end label 22a to be severed is in proper register for cutting.

In operation, the end label 22b of the label strip 22 is overfed to the knife 26 by feed arm 27. At the same time, carriage 30 has moved forwardly with the plunger arm 33 in up position and with solenoid 32 energized. When the carriage 30 starts its return stroke, the solenoid 32 is de-energized so that the plunger arm 33 will descend, engage the label strip 22 and pull it backwardly. As soon as the end label 22a is in proper position, as indicated by scanning of the indicia 22b of that label by the photo-electric cell 35, the solenoid 32 will be energized by the cell so that the yoke 31 raises the plunger arm 33 with the result that the label strip 22 is no longer pulled backwardly. The end label 22a is now in position to be cut. When the reciprocating carriage 30 has reached the end of its return stroke, the knife 26 will move downwardly and sever the end label 22a.

I have not described this part of the machine in particular detail because it is well known in the art and does not form the present invention. For example, conventional switch means are provided to insure that the solenoid 32 and photo-electric cell 35 are operative only at given times in the cycle of operation. Likewise, the electrical connection between the solenoid 32 and photo-electric cell 35 is well within the skill of the art.

Knife mechanism

Figure 3:
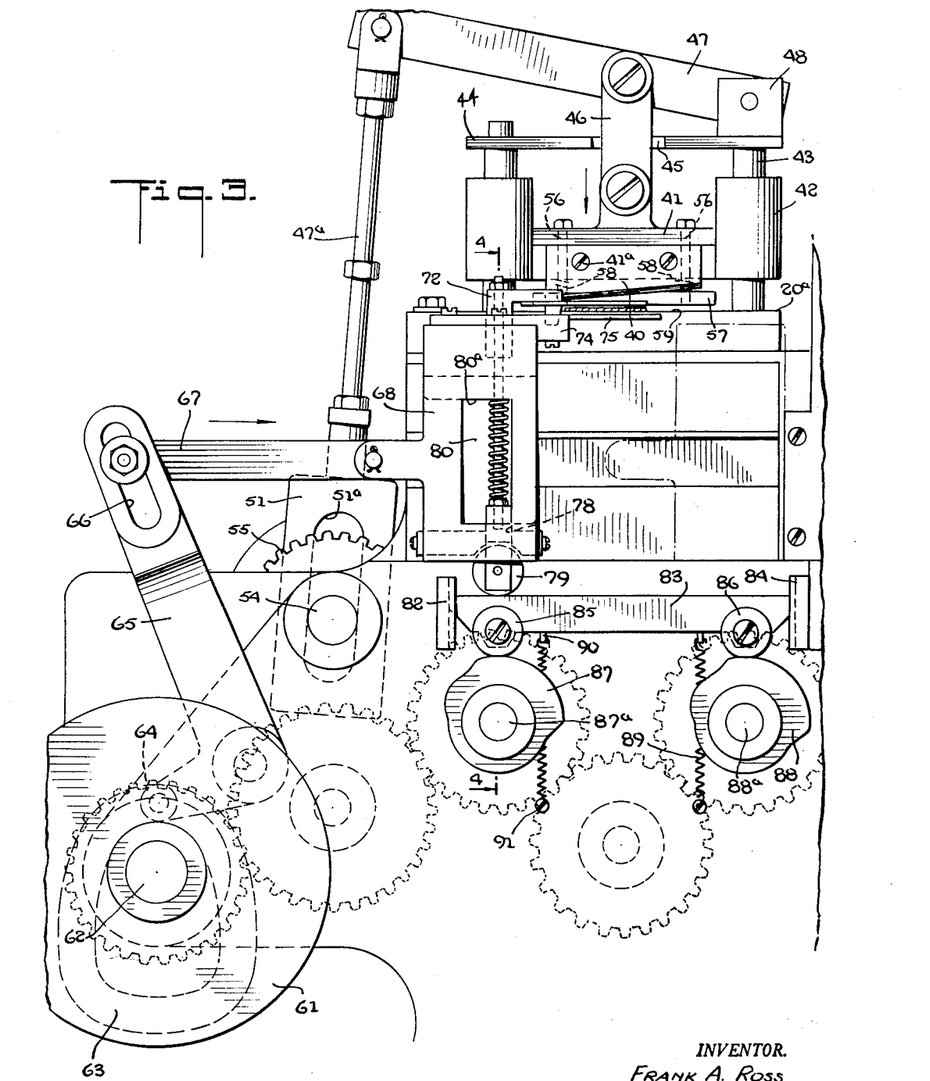
Figure 3 is a detail view in elevation showing the knife mechanism for severing a label and showing the transfer mechanism for carrying the severed label to the folding mechanism.

As indicated in Figure 3, there is shown the knife 26 comprising a knife blade 40 detachably positioned in the frame 41 by screws 41a. The frame 41 is carried by the cylindrical sleeves 42 disposed at either end thereof. The knife frame 41 is vertically bored so as to receive in slidable fashion the parallel bolts 56, which extend down through the knife frame behind the knife blade 40. The bottom ends of the bolts 56 are fixedly received in the flat holding bar 57, which is spaced apart from the bottom of the knife frame 41 by springs 58 disposed around the bolts. The holding bar 57 holds label strip 22 in position as the knife blade 40 descends to cut the end label 22a.

The cylindrical sleeves 42 are slidably mounted on the parallel upright rods 43, which are positioned in the frame 20 at the exit to the parallel rails 25 and on either side thereof. The rods 43 are joined at their tops by the horizontal flat plate 44 which is partially cut away as at 45 so as to admit the link member 46 in the cut-away portion. The link member 46 is pivotally connected at its upper end to the lever 47. The lever 47 is pivotally joined to the stationary block 48 positioned at one end of the plate 44. The other end of the lever 47 is pivotally attached to a rod 47a, which is fixedly joined through plate 49 and stem 50 to a cam block 51.

A cam follower 52 is carried by the cam block 51 on the face thereof and is adapted to engage the kidney-shaped cam 53, which is mounted on the shaft 54 located in the end of the frame 20. A gear 55 is carried on the shaft 54. The cam block 51, which is disposed between gear 55 and cam 53, is slotted as at 51a so that it can move up and down without interfering with shaft 54 which extends through the slot. The gear 55 rotates the shaft 54 and transmits its drive from the main power shaft through suitable gearing (not shown).

When the cam follower 52 is in the depressed portion of the cam 53, the cam block 51 will drop because of its weight and/or by the use of spring pressure means to insure positive relationship between cam and cam follower. When the cam block 51 drops, it will bring the lever 47, knife frame 41, holding bar 57 and knife blade 40 into the down or cutting position. As the holding bar 57 descends with the knife frame 41, it will press upon the label strip 22 and hold it fast. The knife blade 40 will continue its downward movement against the urging of springs 58 and sever the end label 22a. Correspondingly, the knife blade 40 and associated parts will rise into open position when the cam follower 52 is on a high point of the cam 53. The edge 59 of the frame 20 below the knife frame 41 serves as a stationary shearing edge for knife blade 40. Although not shown, a stationary and separate lower knife may be employed as the shearing edge. In such a case the stationary lower knife would be attached to the frame 20 by suitable screws so that it may be removed for sharpening as required.

The rotation of the cam 53 is so timed with relation to movement of feed arm 27 and pull-back mechanism 24 that the knife blade 40 will be open or in the up position when the strip 22 of labels is fed forwardly and then withdrawn for registry. Just as soon as the carriage 30 of the pull-back mechanism 24 has reached the end of its return stroke, the knife blade 40 will descend, thereby severing the balanced end label 22a. At the same time as the knife blade 40 drops, the transfer mechanism will seize the severed label 22a.

Transfer mechanism

Figure 2:
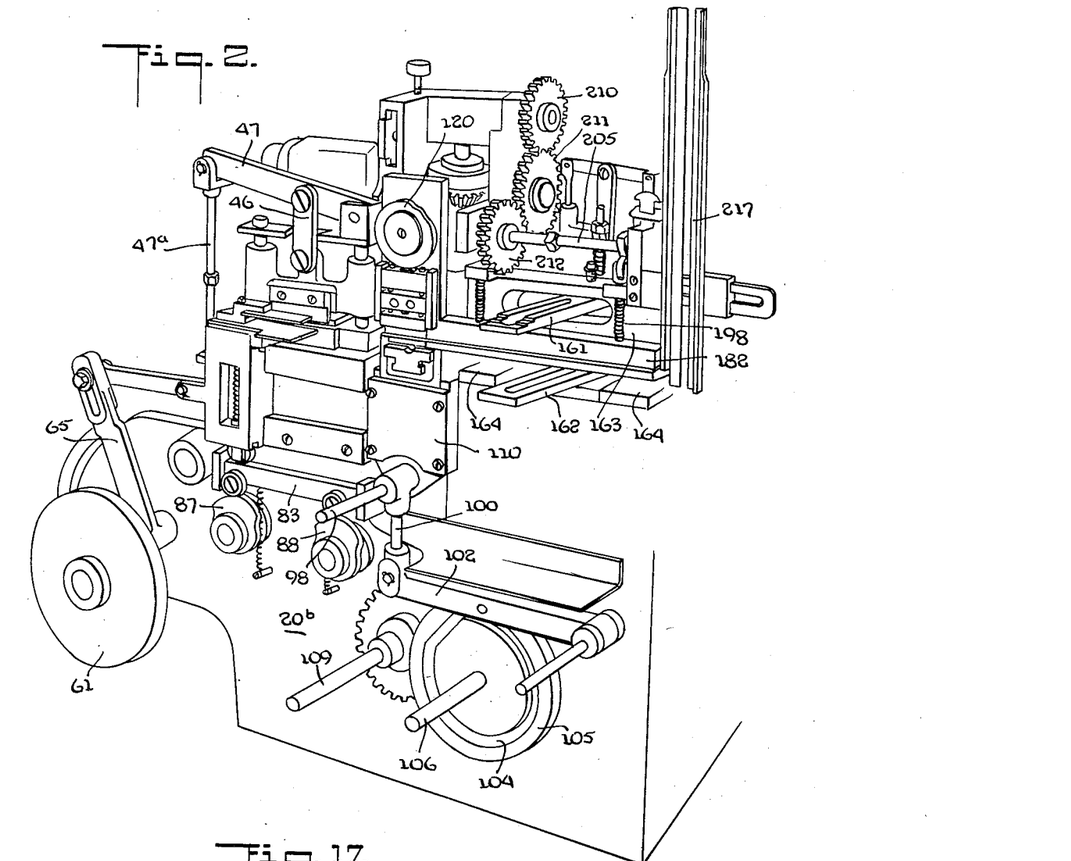
Figure 2 is a view in perspective of the right end of my machine, the auxiliary frame and its attached parts being removed.
Figure 4:
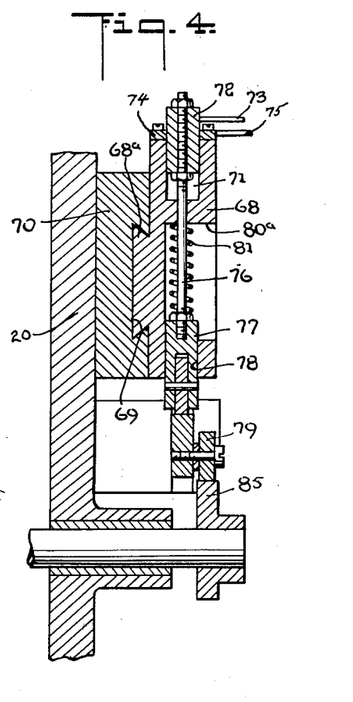
Figure 4 is a sectional view taken on lines 4—4 of Figure 3, and looking in the direction of the arrows.

The transfer mechanism for carrying the severed label 22a to the folder mechanism is best seen in Figures 2, 3 and 4. The transfer mechanism comprises a fly wheel 61 mounted on the shaft 62, which extends outwardly from the end of the frame 20. A cam track 63 is disposed on the inner face of the fly wheel 61 and is adapted to receive the cam follower 64 positioned on the lower end of L-shaped arm 65. The L-shaped arm 65 is rotatably mounted on the stationary shaft 66 which extends outwardly, like shaft 62, from the end of the frame 20. The L-shaped arm 65 is so positioned that it is partially above and behind the fly wheel 61.

The upper end of the L-shaped arm 65 is slotted as at 66 to receive one end of a pusher link 67. The other end of pusher link 67 is pivotally connected to the transfer carriage 68, which is adapted to slidably reciprocate in the horizontal channel 69 located in the face of base 70. The base 70 is integrally connected to the end of frame 20 below the knife mechanism.

The projecting portion 68a of carriage 68 is shaped so that it will dovetail with channel 69. The cam track 63 is so timed that rotation of the fly wheel 61 will cause the cam follower 64 to move up and down thereby oscillating the L-shaped arm 65, which in turn will horizontally reciprocate the carriage 68 below the knife mechanism. Thus, with each rotation of the fly wheel 61, the carriage 68 will slide up and back once along the channel 69.

Along the top of carriage 68 there is provided a slot 71 which is adapted to slidably receive an L-shaped blade holder 72 having a blade 73 extending horizontally therefrom in a direction transverse to label strip 22. An L-shaped plate 74, slotted down the middle and surrounding the blade holder 72 on three sides, is fastened to the top of carriage 68. The plate 74 detachably carries a stationary folder blade 75 in a position below the blade 73. These blades 73 and 75 form the jaws of the transfer mechanism and are so located that they will seize an end label 22a as it is being severed by knife blade 40.

The L-shaped blade holder 72 is supported by rod 76 which extends down through carriage 68 to a slidable block 77 located in a vertical bore 78 at the bottom of the carriage 68. A wheel 79 is rotatably mounted in the block 77. The middle portion of the face of carriage 68 is cut away as at 80, thereby exposing the coil spring 81 embracing the rod 76. The ends of coil spring 81 bear against the top of sliding block 77 and wall 80a of carriage 68 so that the spring normally urges the sliding block 77 downward and, accordingly, pulls the upper blade 73 to a closed position.

A pair of opposingly grooved brackets 82 are permanently attached to the end of the frame 20 below the base 70. The brackets 82 receive in their grooves 84 the ends of a cam bar 83. The cam bar 83 is so positioned that the wheel 79 rides along the top of the bar as the carriage 68 reciprocates along channel 69.

Spaced apart cam followers 85 and 86 are carried along the bottom of cam bar 83 and are adapted to ride upon the cams 87 and 88, respectively. The cams 87 and 88 are respectively mounted on and rotated by cam shafts 87a and 88a. The cam bar 83 is normally pulled downward by the springs 89 which are connected at their upper ends to eyes 90 on the bottom of the cam bar and at their lower ends to the pins 91 located in the end of the frame 20.

Thus, when the cam followers 85 and 86 are on the high points of the cams 87 and 88, respectively, the cam bar 83 and, accordingly, rod 76, L-shaped blade holder 72, and upper blade 73 will move upwardly so that the jaws of the transfer mechanism will be open. Conversely, the upper blade 73 will descend and engage folder blade 75 to close the jaws of the transfer mechanism when the cam followers 85 and 86 are on low points of the cams 87 and 88, respectively.

The cams 87 and 88 and fly wheel 61 are so timed that when the carriage 68 is at the extreme left side of the channel 69, as shown in Figure 3, the blades 73 and 75 of the transfer mechanism will be in open position. In this position, an end label 22a of the label strip 22 lies between the blades 73 and 75. When the knife blade 40 has severed the end label 22a, the blades 73 and 75 will close and seize the severed label. At the same time, the carriage 68 will start to move along the channel 69. The forward movement of the carriage 68 is such that the severed label 22a will be brought to a position where it can be gripped by the folder mechanism. After the folder mechanism has seized and folded the severed label 22a, the blades 73 and 75 release their hold upon the label and the carriage 68 moves backwardly to its initial position to seize the next label.

*Folder mechanism*

Figure 5:
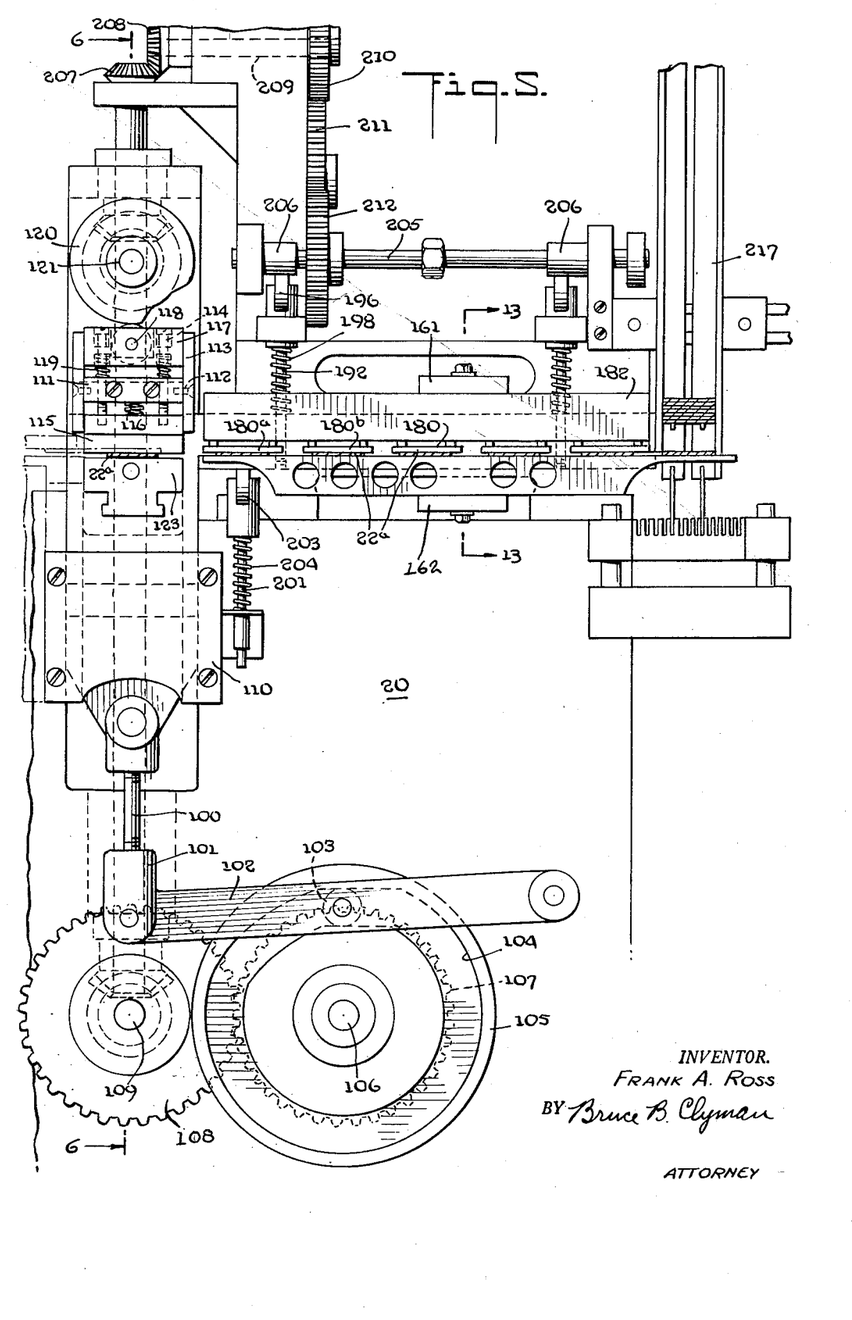
Figure 5 is a detail view in elevation showing half of the folding and pressing mechanisms, their corresponding opposite portions being removed.
Figure 6:
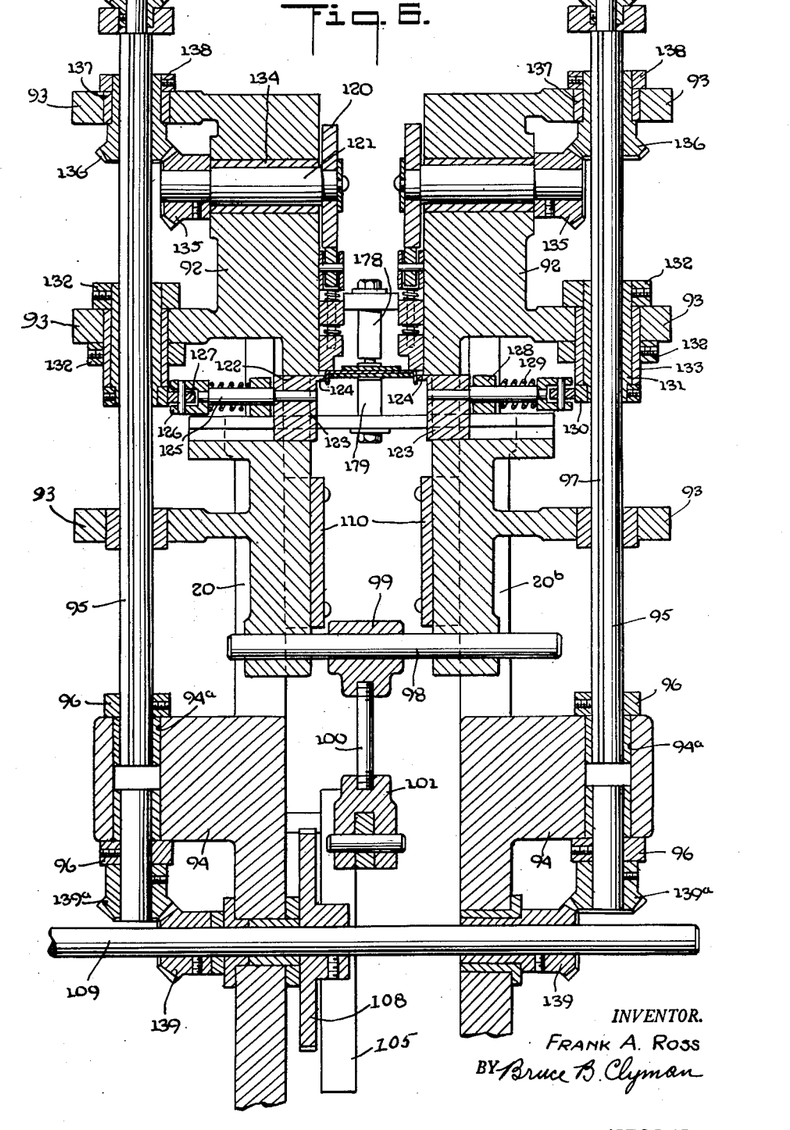
Figure 6 is a sectional view taken on lines 6—6 of Figure 5, looking in the direction of the arrows, and showing the folding mechanism and the parts for actuating the same.

As seen in Figures 5 and 6, there is provided a pair of folder frame members 92 having their faces in opposed relation. One frame member 92 is slidably disposed in a recess in the end of frame 20 and the other is similarly disposed in a recess in auxiliary frame 20b. The auxiliary frame 20b may be attached in any suitable manner to the frame 20 so that it can be adjustably moved toward and away from the end of the frame 20. This adjustability is necessary to accommodate the various sized labels as will be seen later. Each folder frame member 92 has three ring members 93 located at its rear in a vertical line and in regularly spaced apart fashion. Each ring member 93 is integrally attached to its associated folder frame member 92. Guide plates 110, which are attached to frame 20 and auxiliary frame 20b, extend across the lower faces of the folder frame members 92. These guide plates 110 serve to retain the folder frame members 92 in line as they move vertically.

The frame 20 and auxiliary frame 20b each have at their lower extremities an extending support member 94. A pair of parallel upright shafts 95 extend through bores 94a in the support members 94. Collars 96 are disposed around and fixedly engage each shaft 95 both above and below the support members 94 so as to prevent the shafts from moving vertically therein. Each shaft 95 has a keyway 97 extending its length. Moreover, each shaft 95 extends up through the ring members 93 of the folder frame member 92 associated therewith. The ring members 93 embrace the shafts 95 in such manner that the folder frame members 92 can move vertically or in parallel relation to the shafts.

A horizontal stationary rod 98 connects the bottom of each folder frame 92, and a T-shaped collar 99 fixedly embraces the connecting rod 98 at a point between the folder frame members. Threadably received in the T-shaped collar 99 and extending downwardly therefrom is a link bar 100 which is threadably received in the connecting member 101 which, in turn, is pivotally connected to one end of the lever 102. The other end of cam lever 102 is pivotally connected to the frame 20. The cam lever 102 carries a cam follower 103 which is adapted to ride in the cam track 104 disposed on the inner face of cam wheel 105. The cam wheel 105 is mounted on the gear shaft 106 which carries the gear 107. The gear 107 meshes with gear 108 on gear shaft 109, which receives its drive from the main power system.

The cam wheel 105 is so timed that the free end of cam lever 102 will oscillate up and down once during every rotation of the cam wheel. The oscillation of the cam lever 102, of course, will cause the folder frame members 92 to move correspondingly up and down. When the cam follower 103 is in a high part of cam track 104, the folder frame members 92 will be in the up position and when the cam follower is in a low part of the track, the folder frame members will be in the down position. Thus, with every cycle of the cam wheel 105, the folder frame members 92 will complete a single vertical oscillation.

For the sake of simplicity, I shall describe the operative parts associated with the folder frame members 92 with respect to the folder frame member at the end of frame 20. It is to be understood, of course, that the folder frame member 92 on auxiliary frame 20b has corresponding and similar operative parts.

On the face of the folder frame member 92 there is provided a horizontal stationary cross bar 111 which is held to the frame member by screws 112. A pair of vertically extending and parallel stationary guide bars 113 are connected to the ends of the cross bar 111. A pair of parallel bolts 114 slidably extend through the cross bar 111. The lower ends of the bolts 114 are threadably received in an L-shaped creasing slide 115, which is adapted to move vertically between the guide bars 113 and along the face of its associated folder frame member 92. A coil spring 116 disposed between the creasing slide 115 and the cross bar 111 normally urges the creasing slide downwardly.

Located above the cross bar 111 and between the guide bars 113 is a slidable block 117 carrying a cam follower 118. The upper parts of bolts 114 are slidably received in the block 117. Coil springs 119 embrace the bolts 114 above the stationary cross bar 111. These coil springs 119, which extend up into suitable recesses in the bottom of slidable block 117 and seat upon cross bar 111, tend to normally urge the slidable block 117 upwardly so that cam follower 118 engages the cam wheel 120, which is disposed thereabove on the cam shaft 121 extending horizontally through the top of the folder frame member 92.

The cam wheel 120 is so timed that when the cam follower 118 is at a high point on the cam wheel, the creasing slide 115 will be moved downwardly. Conversely, when the cam follower 118 is on the recessed portion of the cam wheel 120, the creasing slide 115 will move upwardly.

The folder frame member 92 has a horizontal slot 122 extending therethrough along a line below middle ring member 93. The slot 122 is adapted to receive the horizontally movable tucker slide 123. A tucker lip 124 extends outwardly from the top of tucker slide 123, which is so positioned that the creasing slide 115 in its lowermost position will just engage the top of the tucker lip 124. The tucker slide 123 is moved by a cam actuated horizontal rod 125, which is of reduced diameter at both ends. One reduced end of the rod 125 is fixedly inserted in tucker slide 123 and the other end is fixedly inserted in the base of the U-shaped cam follower casing 126, which carries the cam follower 127 between its sides. The thickened portion of the rod 125 slidably extends through collar 128 which is fixedly connected to the frame 20. A coil spring 129 embraces the thickened portion of the rod 125 between the collar 128 and the base of U-shaped casing 126. This coil spring 129 normally urges the U-shaped casing 126, cam follower 127 and tucker slide 123 in a direction away from the face of the folder frame member 92.

The cam follower 127 is adapted to ride upon the cam 130 which is fixedly mounted on the bottom of bushing 131, which bushing in turn is keyed to the shaft 95. Collars 132 are fixedly engaged around the ends of bushing 131 both above and below middle ring member 93 so as to hold bushing 131 in place with respect to the vertically moving folder frame member 92. A sleeve 133 is disposed around bushing 131 between the collars 132.

When the cam follower 127 rides on a high point of the cam 130, the tucker slide 123 will be urged toward the opposing tucker slide. Conversely, it will move away from the opposing tucker slide 123, when the cam follower 127 is on a low point of cam 130.

The cam shaft 121, which carries cam wheel 120 at one end thereof, extends through horizontal sleeve 134 fixedly mounted in the top portion of the folder frame member 92 at a point below the uppermost ring member 93. The other end of the cam shaft 121 extends beyond the rear face of the folder frame member 92 and fixedly carries a horizontally disposed bevel gear 135 thereon. The bevel gear 135 is adapted to mesh with vertically disposed bevel gear 136, which embraces and is keyed to the rotating shaft 95. The bevel gear 136 is received in sleeve 137 fixedly mounted in the uppermost ring member 93, A collar 138 is fixedly engaged to the bevel gear 136 at a point above the uppermost ring member 93. When folder frame member 92 moves vertically along shaft 95, the bevel gears 135 and 136 will adopt the same motion without losing their mesh engagement.

The rotating shaft 109, which supplies drive to cam wheel 105 from the main power system, extends horizontally through the lower portions of frame 20 and auxiliary frame 20b. A pair of horizontally disposed bevel gears 139 are fixedly engaged on the rotating shaft 109 and each bevel gear 139 is adapted to mesh with a vertically disposed bevel gear 139a positioned on the lower part of each shaft 95. Thus, power will be transmitted from the main power system through shaft 109 to parallel upright shafts 95 so as to actuate creasing slides 115 and tucker slides 123. Since the cam wheel 105, which controls the vertical movement of the folder frame members 92, also receives its drive from the shaft 109, it is possible through the proper cam design and adjustment of gear ratios to have the creasing slides 115, tucker slides 123 and the folder frame members 92 all move in predetermined relation to each other.

Figures 7, 8, 9, 10, 15:
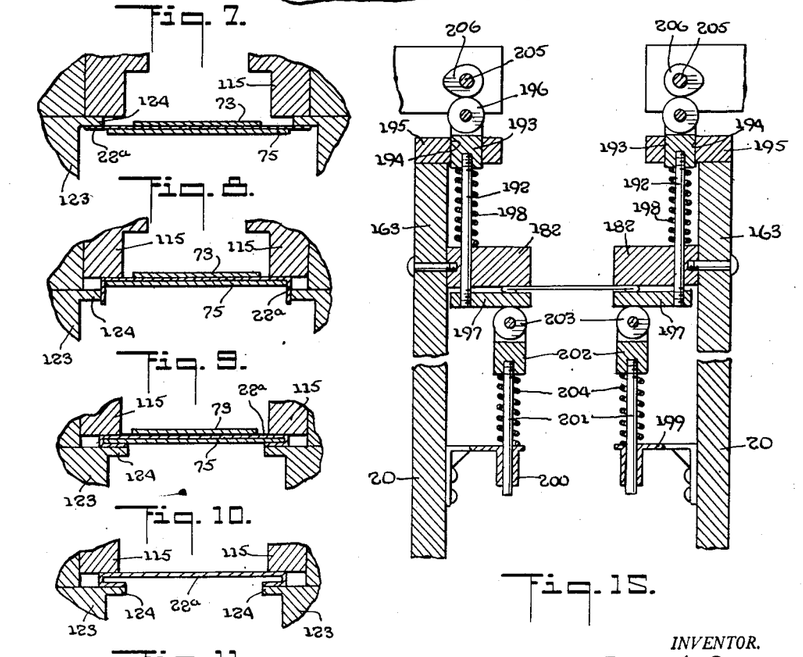
Figures 7–11 are fragmentary sectional views showing step by step operation of the folding mechanism for folding a severed label.
Figure 15 is a sectional view taken on lines 15—15 of Figure 14, looking in the direction of the arrows, and with the reciprocating jaws being removed.

The various steps whereby a severed end label 22a is folded and given a preliminary crease by the folder mechanism are shown in Figures 7 through 11. As seen in Figure 7, the severed label 22a is carried by the jaws of the transfer mechanism to a point intermediate the folder frame members 92 and just below the tucker lips 124. Upper blade 73 of the transfer jaws is narrower than the lower folder blade 75 so that the exposed part of the label 22a not covered by the upper blade 73 can be engaged by the bottom of the descending creasing slides 115. The width of the folder blade 75 governs the length of the folded label.

Next, the folder frame members 92 descend, bringing along with them the tucker slides 123 and the creasing slides 115. As the bottom of the creasing slides 115 engage the exposed parts of the label 22a, the cam followers 118 will enter the depressed portions of the cam wheels 120 so that the creasing slides move upwardly. However, since the folder frame members 92 are still descending, the creasing slides 115 will be stationary relative to the end label 22a. Meanwhile, the tucker slides 115 in their downward descent have caused the ends of the label 22a to be bent downwardly at right angles as seen in Figure 8.

When the folder frame members 92 have reached their lowermost point, the tucker slides 123, which are now spaced apart from the creasing slides 115, move toward each other so that the ends of the label 22a are bent underneath the folder blade 75 of the transfer jaws by tucker lips 124 as seen in Figure 9. The folder frame members 92 still remain in lowered position.

The transfer jaws release their hold on the folded label 22a and the transfer carriage 68 begins its return to its initial starting point, leaving the folded label between the tucker lips 124 and the bottoms of the creasing slides 115 as seen in Figure 10.

Figure 11:
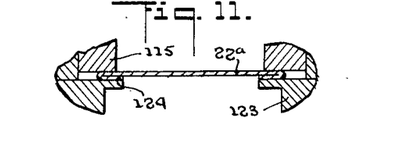

Just as soon as the transfer jaws have withdrawn, the cam followers 118 will start to move out of the recessed portions of the cam wheels 120 causing the creasing slides 115 to move downwardly against the extended tucker lips 124 and give the folded label 22a a preliminary crease as seen in Figure 11. The label 22a is now held at its end by the creasing slides 115 and tucker slides 123. Finally, the folder frame members 92 ascend carrying the tucker slides 123, creasing slides 115, and folded label 22a upwardly to a level where the folded label can be seized by a pair of reciprocating jaw means which carry it into the pressing mechanism.

*Pressing mechanism*

In order to carry a folded label 22a to the pressing mechanism and then convey the pressed label to a suitable stacking mechanism, I employ the arrangement particularly shown in Figure 5 and Figures 12 through 15.

Figure 12:
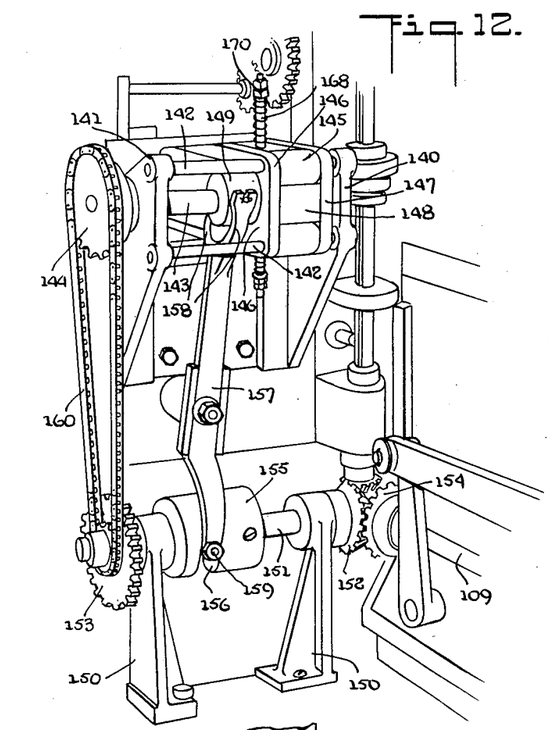
Figure 12 is a perspective view of part of the rear of the machine showing the mechanism for actuating the reciprocating jaws which carry a label from the folding mechanism to the pressing mechanism.

With particular reference to Figure 12, a pair of outwardly extending, parallel winglike structures 140 and 141 are provided on the rear of the frame 20 adjacent the upright shaft 95. A pair of parallel, horizontal stationary bars 142 are mounted in the winglike structures 140 and 141. A rotatable shaft 143 is journalled at one end in winglike structure 140 and its other end extends through winglike structure 141. A gear 144 is carried on the end of the shaft 143 which extends through the winglike structure 141.

A reciprocating carriage 145, comprising the parallel side plates 146 and 147 joined at their rear to the cross plate 148, is slidably mounted on the stationary bars 142, which bars extend through the side plates both above and below the cross plate 148. A metal collar 149, which slidably embraces the rotatable shaft 143, is integrally connected to the side plate 146 nearest winglike structure 141.

Disposed below the winglike structures 140 and 141 and carried by support members 150 located at the base of the frame 20 is a rotating shaft 151 having a horizontally disposed bevel gear 152 at one end and a circular gear 153 at its opposite end. The bevel gear 152 meshes with the bevel gear 154 located on the shaft 109, which receives its drive from the main power system. The endless chain belt 160 connects gears 144 and 153 so that power to rotate shaft 143 is transmitted from shaft 151.

A cam cylinder 155 having the cam track 156 thereon is fixedly mounted on and rotates with shaft 151. A yoke 157 is pivotally connected near its center to the frame 20 at a point between the shafts 143 and 151. The upper end of the yoke 157 has a pair of arms 158 which embrace and are attached to the metal collar 149. The lower end of the yoke 157 carries a cam follower 159 which rides in the cam track 156. The cam track 156 is so located that with each rotation of the cam cylinder 155, the yoke 157 will oscillate about its pivotal point. Thus, the upper end of the yoke 157 will cause the metal collar 149 and carriage 145 to reciprocate along the horizontal shaft 143.

A pair of levers 161 and 162 are pivotally mounted at their ends on bars 142 between the side plates 145 and 146. A plate 163 is permanently attached by its legs 164 to the frame 20. This plate 163 is located adjacent the carriage 145 and has a pair of elongated slots 165 and 166 therein. The lever 161 extends through the upper slot 165 and the lever 162 extends through the lower slot 166. Both slots 165 and 166 are of such width that they will not interfere with the movement of the levers 161 and 162 as the carriage 145 reciprocates along shaft 143.

Between the levers 161 and 162 and integrally connected to the side plates 146 and 147 is a stop member 167. A rod 168, threadably mounted in the top of the stop member 167, extends upwardly through a hole 169 in the lever 161. A nut 170 is threadably fixed to the upper end of the rod 168. Embracing the rod 168 and bearing against the top of the lever 161 and the undersurface of the nut 170 is a coil spring 171, which normally urges the lever 161 downwardly so that it rests against the stop member 167.

In like manner there is threadably received in the bottom of the stop member 167 a rod 172, which extends downwardly through a hole 173 in the lever 162. The lowermost end of the rod 172 carries nut 174. A coil spring 175 embraces the rod 172 and bears against the lever 162 and nut 174 so as to urge the lever 162 up against the bottom of the stop member 167.

Figure 13:
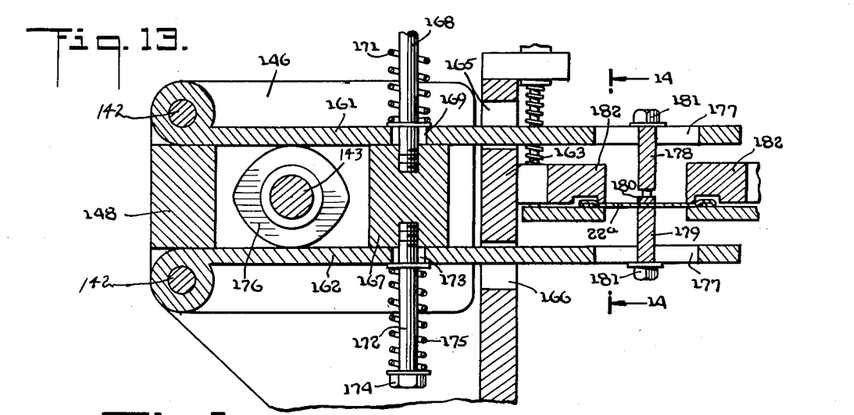
Figure 13 is a sectional view taken on lines 13—13 of Figure 5, and looking in the direction of the arrows.
Figure 14:
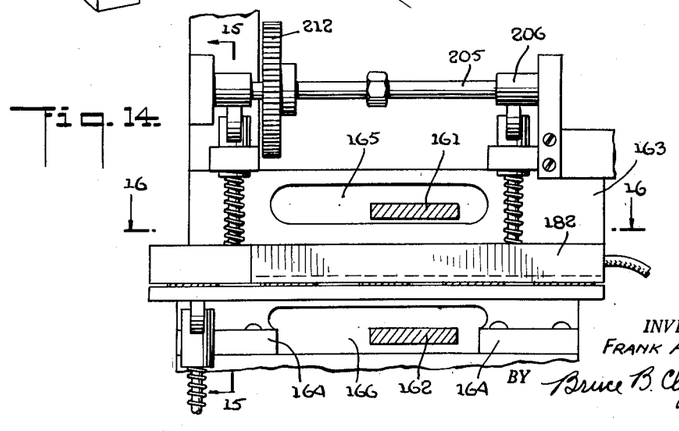
Figure 14 is a view in partial elevation taken on lines 14—14 of Figure 13, and looking in the direction of the arrows.

The rotating shaft 143 previously described extends through the carriage 145 between the stop member 167 and the cross plate 148. Fixedly mounted on this shaft 143 is an oval cam 176 which is adapted to rotate therewith and adapted to continually bear against the undersurface of lever 161 and upper surface of lever 162 so as to periodically spread them apart against the urgings of springs 171 and 175. When the elongated ends of the cam 176 have rotated to a vertical position, they will cause the levers 161 and 162 to move away from each other against pressure of the coil springs 171 and 175. When the elongated ends of the cam 176 are in horizontal position as shown in Figure 13, the pressure of the coil springs 171 and 175 will force the levers 161 and 162 against the stop member 167. Thus, movement of the cam 176 imparts an opening and closing motion to the levers 161 and 162 as they reciprocate with carriage 145 along shaft 143.

The levers 161 and 162 have narrow elongated openings 177 which begin near the free ends thereof and extend along the partial length of the levers. The levers 161 and 162 carry at their free ends a pair of reciprocating jaws 178 and 179, respectively. Each jaw 178 and 179 is mounted transversely of its associated lever 161 and 162 and both are adapted to coact when the levers 161 and 162 open and close. The bottom of the upper jaw 178 carries a plurality of foot members 180, which are adapted to engage the top of the bottom jaw 179 when the levers 161 and 162 are in a closed position. The foot members 180 represent the various stations to which the folded label is intermittently conveyed by the reciprocating jaws 178 and 179.

Each jaw 178 and 179 is adjustably attached to the end of its associated lever 161 and 162 by means of bolts 181 extending through each associated elongated opening 177 and being threadably received in each associated jaw. The jaws 178 and 179 cooperatively constitute conveying means for grasping each folded label 22a from the folding mechanism and carrying it into the pressing mechanism. By selectively adjusting the bolts 181 in the openings 177, the jaws 178 and 179 may be moved along the levers 161 and 162 to accommodate labels of varying length.

When the levers 161 and 162 are moved apart by the oval cam 176, the jaws 178 and 179 will likewise move away from each other. As the carriage 145 reciprocates horizontally, the jaws 178 and 179 will likewise advance and retract. Thus, it can be seen that the jaws 178 and 179 will have a movement wherein they will be open as they advance, close at the end of their advance movement and seize a folded label from the folding mechanism, then retreat in closed position carrying the folded label into the pressing mechanism, and finally open and once again advance to seize the next folded label.

Figure 16:
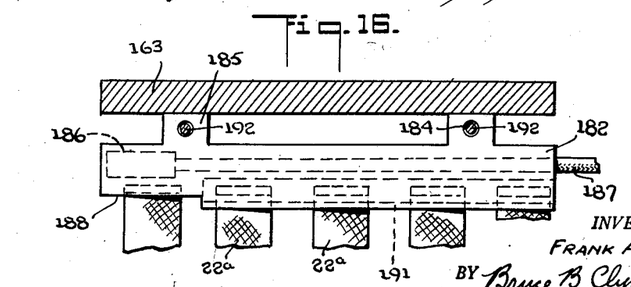
Figure 16 is a partial sectional view taken on lines 16—16 of Figure 14, and looking in the direction of the arrows.
Figure 17:
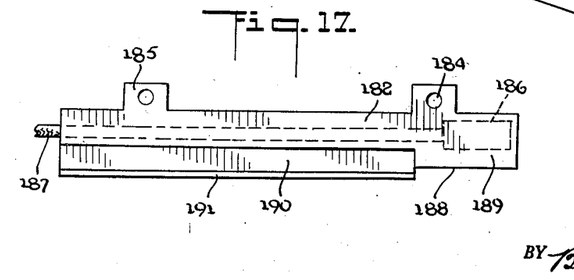
Figure 17 is a bottom view of one of the heated presser means, particularly showing the channel in which a creased end of a label lies as the label moves to the stacking mechanism.

A pair of metal heater bars 182, one of which is connected to the plate 163 on the frame 20 and the other of which is fixed to a similar plate 163 on the auxiliary frame 20b, extend parallel to and on either side of the reciprocating jaws 178 and 179. Each heater bar 182 is of a general rectangular cross section and has a length one label station shorter than that of the reciprocating jaws 178 and 179. As seen in Figure 17, each heater bar 182 has a pair of vertical bores 184 extending through the spaced-apart projecting portions 185 located at one side thereof. An electrical heating element 186 is disposed within the front portion of each heater bar 182. Wires 187, connecting the heating elements to a source of electrical power, extend through each heater bar 182 as seen in Figure 16.

The front portion of each heater bar is recessed as at 188. The undersurface of each heater bar 182 below the heating element 186 is flat and constitutes a heated pressing surface 189. Extending from the recessed front portion 188 to the rear of each heater bar 182 and parallel to the edge thereof is a groove which defines a conveying channel 190 and a depending lip 191.

Rods 192 slidably extend up through the bores 184 in the heater bars 182 and are threadably received at their top ends in the block-shaped mountings 193. The mountings 193 slide in correspondingly shaped bores 194 of the plates 195, which plates are integrally connected to the frame 20 and auxiliary frame 20b and which extend outwardly therefrom. Each block-shaped mounting 193 carries at its top a cam follower 196.

Disposed below each heater bar 182 and extending the length thereof is a flat metal presser bar 197, which threadably receives the bottom ends of the rods 192. Coil springs 198 are disposed around the rods 192 between the block-shaped mountings 193 and the heater bars 182. Since the heater bars 182 are stationary, the coil springs 198 will normally urge the rods 192 and block-shaped mountings 193 upwardly thereby bringing the flat presser bars 197 into engagement with the heated pressing surfaces 189 of the heater bars 182. The heater bars 182 and presser bars 197 are so positioned that they are in line with adjacent folder frame members 92.

In order to insure that the folded label 22a will be permanently creased in a single pressing operation, I employ an auxiliary pressure means to force the heated pressing surfaces 189 and presser bars 197 together. A pair of L-shaped brackets 199 are fixedly attached to the frame 20 and auxiliary frame 20b below the leading portions of the presser bars 197. Each bracket has a depending bored portion 200 which is adapted to slidably receive a spring-actuated rod 201. The top of each rod 201 carries a mounting 202. A small wheel 203 or cam follower is positioned in each mounting 202. Embracing each rod 201 between the mountings 202 and brackets 199 are coil springs 204 which urge the wheels 203 upwardly against the bottoms of their associated presser bars 197.

Disposed above each heater bar 182 and in line therewith are a pair of horizontal rotatable shafts 205. One shaft 205 is carried by the frame 20, as best seen in Figure 5, and the other shaft 205 is carried by similar arrangement on auxiliary frame 20b. Each shaft 205 has positioned thereon and rotating therewith a pair of tear drop shaped cams 206, which continually engage the cam followers 196 and thereby cause the rods 192 to move downwardly when the tails of the cams bear on the cam followers. As the rods 192 move downwardly they will carry the presser bars 197 away from the bottoms of the heater bars 182. When the front ends of the cams 206 bear on the cam followers 196, the presser bars 197 will be urged upwardly against the heater bars 182 by coil springs 198. Thus with every rotation of the shafts 205, the heater bars 182 and presser bars 197 will open and close.

The power for rotating the shafts 205 is transmitted from upright rotary shafts 95 through suitable gearing, which will now be described. Although identical gear arrangements are provided for each shaft 205, I will describe only that particular arrangement used to rotate the gear 205 located on the end of frame 20 as shown in Figure 5. The top of the shaft 95 carries a vertically disposed bevel gear 207, which meshes with horizontally disposed bevel gear 208 located on the end of rotatable shaft 209. The shaft 209 which is positioned on frame 20 carries at its opposite end a circular gear 210 which meshes with suitably mounted gear 211, which in turn meshes with gear 212 on the shaft 205. It is thus seen how shaft 95 serves to actuate shaft 205.

As stated above, an identical arrangement is provided on auxiliary frame 20b to actuate its associated shaft 205 through the shaft 95 on the auxiliary frame. Since the power transmitted by the upright rotary shafts 95 also serves to actuate the creasing slides 115 and tucker slides 123, it is possible through proper adjustment to have the pressing mechanism move in timed relation to the folding mechanism.

After each severed label 22a has been folded by the folder mechanism and while the ends of the label are held between the creasing slides 115 and tucker slides 123, the open reciprocating jaws 178 and 179 will advance and seize the body of the label in such a manner that the label is held between the lower jaw 179 and the leading foot 180a on upper jaw 178. The folder mechanism will then release its hold upon the label 22a so that the reciprocating jaws 178 and 179 can carry the label into the pressing mechanism. As the reciprocating jaws 178 and 179 retract, the presser bars 197 are depressed so that the ends of the folded label 22a will lie between the heated pressing surfaces 189 of the heater bars 182 and the presser bars. Once the folded label 22a is in proper position for pressing, the presser bars 197 will move upwardly and press the folded ends of the label against the heated pressing surfaces 189. As the label 22a is being pressed, the reciprocating jaws 178 and 179 will open and advance forwardly once again to seize the next label.

Since the folded label 22a will only receive a single pressing, it is necessary to insure that this pressing is complete. To achieve this I have provided below the presser bars 197 the spring coils 204, which are of such strength that they will press the presser bars very tightly against the heated pressing surfaces 189. With the added effect of these spring coils 198 disposed above the heater bars 182, the pressure applied to the label 22a is sufficient to insure complete pressing in one step.

When the reciprocating jaws 178 and 179 have seized the next label 22a held in the folder mechanism, they will also close upon the pressed label in the pressing mechanism. In other words, the body of the pressed label 22a is seized between the second foot 180b and the lower reciprocating jaw 179. The presser bars are then moved downwardly and release their grip on the pressed label 22a. Then as the reciprocating jaws 178 and 179 carry the next label 22a into the pressing mechanism, the pressed label is carried further along into the pressing mechanism. As the presser bars 197 move upwardly to press the next label 22a, they will also engage the pressed label and hold it up against the depending lips 191 of the heater bars 182, as best seen in Figure 13. It is to be noted that the pressed folded ends of the label 22a now lie freely in the conveying channels 190 so that there is no further pressing action of these folded ends. The conveying operation is repeated with every advance and retraction of the jaws 178 and 179 until the label 22a is carried to a conventional stacking mechanism 217. The jaws 178 and 179 are one label station longer than the heater bars 182 so that they are able to extend on their advance stroke into the folder mechanism to pick up a folded label and so that on their return stroke they will carry a pressed label into the stacking mechanism which is disposed beyond the heater bars 182.

Thus, it can be seen that by providing auxiliary pressure means and employing heater bars 182 having the conveying channels 190 extending along their inner edges, I have succeeded in pressing each label 22a in one operation and in conveying it to a stacking mechanism without further pressing. Moreover, it is only necessary to employ a slight amount of heat to insure permanent creasing of the pressed label 22a. Therefore, I am able to avoid the need for extremely hot pressing bars or repeated pressing, both of which often result in scorching of the labels.

*Operation*

My novel machine operates as follows: The label strip 22 is moved along between the parallel guide rails 25 by the feed arm 27 so that the end label 22a passes under the open reciprocating knife blade 40. Before the knife blade 40 drops, however, the label strip 22 is pulled backwardly by the plunger arm 33 of the pull-back mechanism 24. During this backward movement the end label 22a is balanced by the photoelectric cell 25 disposed near the knife blade 40. When the end label 22a is balanced, the label strip 22 will assume a stationary position and the reciprocating knife blade 40 will drop and sever the end label. As the end label 22a is severed it is seized by the blades 73 and 75 of the transfer mechanism, which then moves forward and carries the severed label between the vertically movable folder frame members 92 of the folder mechanism.

While the body of the severed label 22a is held by the blades 73 and 75 of the transfer mechanism, the folder frame members 92 will move downwardly so that the tucker lips 124 of the tucker slides 123 will bring the ends of the label 22a downwardly and so that the bottoms of the creasing slides 115 will press against the label, as seen in Figure 8. The tucker slides 115 will then move towards each other so as to bend the ends of the label 22a around the folder blade 75 of the transfer mechanism. Next, the transfer mechanism returns to its original position alongside the knife 26 thereby permitting the creasing slides to further descend and give a preliminary crease to the folded ends of the label. The folder frame members 92 next will move upwardly carrying the folded label 22a to a level where it can be seized by the reciprocating jaws 178 and 179 of the transfer mechanism. After the folder mechanism has released its hold on the folded label 22a, it is carried by the reciprocating jaws 178 and 179 into the pressing mechanism. The folded ends of the label will lie between the heated pressing surfaces 189 of the heater bars 182 and the presser bars 197.

While the label 22a is still held by the reciprocating jaws 178 and 179, the folded ends will be permanently creased as the presser bars move up against the heated surfaces 189 of the heating bars 182. The ends of the label 22a are now held by the pressing mechanism so that the reciprocating jaws 178 and 179 may release their grip on the body of the label and advance to seize the next folded label. As the reciprocating jaws 178 and 179 seize the next label 22a to be pressed, they also close upon the pressed label. The pressing mechanism then releases its hold upon the pressed label 22a so that it may be carried further back between the heater bars 182 by the reciprocating jaws 178 and 179. The pressed and folded label is now merely conveyed by the pressing mechanism and reciprocating jaws. No further pressing is given to the label 22a. The pressed and folded ends of the label 22a lie freely in the conveying channels of the heater bars 182 as the label 22a is moved along to a conventional stacking mechanism.

While the invention has been described in detail and shown with respect to the accompanying drawings, it is not to be limited to such details, since many changes and modifications may be made in the invention without departing from the spirit and scope thereof. Hence, it is desired to cover any and all forms and modifications of the invention which may come within the language and scope of any one or more of the appended claims.

I claim:

1. A machine for automatically cutting, folding and pressing labels comprising, in combination, a knife mechanism, means for feeding a strip of labels to said knife mechanism, said knife mechanism being adapted to sever the end label of said label strip, mechanism for folding said severed label, transfer means adapted to seize said end label as it is being severed by said knife mechanism and to carry it to said folding mechanism, pressing means to permanently crease said folded label in one pressing operation, said pressing means including a pair of parallel stationary members being heated along their front undersurfaces, said stationary members having longitudinally disposed conveying channels on their undersurfaces, each said channel being longer than the length of an individual label, said channels forming depending lips along the inner edges of said stationary members, a pair of parallel pressing members disposed below said heated members and being adapted to move upwardly at periodic intervals so as to press the folded ends of a label against the heated surfaces of said stationary members, and a pair of reciprocating jaw means adapted to receive a folded label from said folding mechanism and carry it into the pressing mechanism so that the folded ends of said label lie between the heated surfaces of the stationary members and the pressing members and said jaw means being further adapted to convey said label, after it has been pressed, between said stationary members and said pressing members in such a manner that the folded ends of said label move freely in said conveying channels.

2. A machine for automatically cutting, folding and pressing labels comprising, in combination, a knife mechanism, means for feeding a strip of labels to said knife mechanism, said knife mechanism being adapted to sever the end label of said label strip, mechanism for folding said severed label, transfer means adapted to seize said end label as it is being severed by said knife mechanism and to carry it to said folding mechanism, said folding mechanism being adapted to tuck the ends of said label underneath the body thereof, pressing means to permanently crease the ends of said folded label in a single pressing operation, said pressing means including a pair of parallel and stationary members being heated along the front portions of their undersurfaces, said stationary members having longitudinally disposed conveying channels on their undersurfaces to the rear of said heated undersurfaces, said channels forming depending lips along the inner edges of said stationary members, each said channel being longer than the length of an individual label, a pair of parallel pressing bars disposed below said stationary members and being adapted to move upwardly at predetermined intervals so as to press the folded ends of a label against the heated undersurfaces of said stationary members, spring means disposed above said stationary members, spring means disposed below said pressing bars, both said spring means adapted to cooperate in moving said pressing bars against said stationary members, a pair of reciprocating jaws disposed between said stationary members and said pressing bars and being adapted to receive a folded label from said folding mechanism and carry it into the pressing mechanism in such manner that the folded ends of said label lie between the heated undersurfaces of the stationary members and the presser bars and said folding mechanism being further adapted to convey said label, after it has been pressed, between said stationary members and said presser bars in such a manner that the folded ends of said pressed label move freely in said conveying channels.

3. A machine for automatically cutting, folding and pressing labels comprising, in combination, a knife mechanism, means for feeding a strip of labels to said knife mechanism, said knife mechanism being adapted to sever the end label of said label strip, folding mechanism for tucking the ends of said severed label underneath the body thereof, transfer means including an upper jaw and a lower jaw, said jaws being adapted to seize said end label as it is being severed by said knife mechanism and further being adapted to move transversely of said label strip so as to carry said severed label to said folding mechanism, said folding mechanism including a pair of opposing vertically movable frame members, a pair of opposing vertically movable creasing slides mounted on said folder frame members, and a pair of opposing horizontally movable tucker slides mounted on said folder frame members below said creasing slides, a pressing mechanism to permanently crease said folded label in one operation, said pressing mechanism including a pair of stationary members being heated at their undersurfaces, said stationary members having conveying channels on their undersurfaces, said channels defining depending lips along the inner edges of said stationary members, each said channel being longer than the length of an individual label, a pair of parallel pressing members disposed below said stationary members and being adapted to move upwardly at predetermined intervals so as to press a folded label against the heated undersurfaces of said stationary members, and reciprocating means adapted to receive a folded label from said folding mechanism and carry it into the pressing mechanism and said reciprocating means further adapted to convey said label, after it is pressed, between said stationary members and said pressing members in such a manner that the folded ends of said label move freely in said conveying channels.

4. A machine for automatically cutting, folding and pressing labels comprising, in combination, a knife mechanism, means for feeding a strip of labels to said knife mechanism, said knife mechanism being adapted to sever the end label of said label strip, folding mechanism for tucking the ends of said severed label underneath the body thereof, transfer means including an upper jaw and a lower jaw, said jaws being adapted to seize said end label as it is being severed by said knife mechanism and further being adapted to move transversely of said label strip so as to carry said severed label to said folding mechanism, said folding mechanism including a pair of opposing vertically movable frame members, a pair of opposing vertically movable creasing slides mounted on said folder frame members, and a pair of opposing horizontally movable tucker slides mounted on said folder frame members below said creasing slides, a pressing mechanism to permanently crease said folded label in one pressing operation, said pressing mechanism including a pair of elongated stationary members being heated at their front undersurfaces, said stationary members having conveying channels on their undersurfaces, each said channel being longer than the length of an individual label, said channels defining depending lips along the inner edges of said stationary members, a pair of parallel pressing members disposed below said stationary members and being adapted to move upwardly at predetermined intervals so as to press a folded label against the heated undersurfaces of said stationary members, and reciprocating means adapted to receive a folded label from said folding mechanism and carry it into the pressing mechanism so that the folded ends of said label lie between the heated undersurfaces of the stationary members and the pressing members, said reciprocating means further adapted to convey said label, after it is pressed, between said stationary members and said pressing members in such a manner that the folded ends of said label move freely in said conveying channels, and said strip feeding means, said knife mechanism, said transfer means, said folding mechanism and said pressing mechanism all adapted to actuate in predetermined relation to each other.

5. A machine in accord with claim 3 having pressure means disposed above said stationary members and auxiliary pressure means disposed below said pressing members, both said pressure means adapted to cooperate in moving said pressing members against said stationary members.

6. A machine in accord with claim 4 having pressure means disposed above said stationary members and auxiliary pressure means disposed below said pressing members, both said pressure means adapted to cooperate in moving said pressing members against said stationary members.

7. A machine for automatically cutting, folding and pressing labels comprising, in combination, a knife mechanism, means for feeding a strip of labels to said knife mechanism, said knife mechanism being adapted to sever the end label of said label strip, folding mechanism for tucking the ends of said severed label underneath the body thereof, transfer means including a vertically movable upper jaw and a lower jaw, said upper jaw adapted to periodically move against said lower jaw and seize a severed label therebetween, both said jaws being adapted to move transversely of said label strip so as to carry said severed label to said folding mechanism, said folding mechanism including a pair of opposing vertically movable frame members, a pair of opposing vertically movable creasing slides mounted on said folder frame members, and a pair of opposing horizontally movable tucker slides mounted on said folder frame members below said creasing slides, a pressing mechanism to permanently crease said folded label in one pressing operation, said pressing mechanism including a pair of elongated stationary members heated at their undersurfaces, said stationary members having conveying channels on their undersurfaces, each said channel being longer than the length of an individual label, said channels defining depending lips along the inner edges of said stationary members, a pair of parallel pressing members disposed below said stationary members and being adapted to move upwardly at predetermined intervals so as to press a folded label against the heated undersurfaces of said stationary members, and reciprocating jaw means disposed between said stationary members and said pressing members adapted to receive a folded label from said folding mechanism and carry it into the pressing mechanism so that the folded ends of said label lie between the heated undersurfaces of the stationary members and the pressing members, said reciprocating jaw means further adapted to convey said label, after it is pressed, between said stationary members and said pressing members in such a manner that the folded ends of said label move freely in said conveying channels, and a stacking mechanism to receive said pressed label from said pressing mechanism.

8. A machine for automatically cutting, folding and pressing labels comprising, in combination, a knife mechanism, means for feeding a strip of labels to said knife mechanism, said knife mechanism being adapted to sever the end label of said label strip, folding mechanism for tucking the ends of said severed label underneath the body thereof, transfer means including an upper jaw and a lower jaw, said jaws being adapted to seize said end label as it is being severed by said knife mechanism and further being adapted to move transversely of said label strip so as to carry said severed label to said folding mechanism, said folding mechanism including a pair of opposing vertically movable frame members, a pair of opposing vertically movable creasing slides mounted on said folder frame members, and a pair of opposing horizontally movable tucker slides mounted on said folder frame members below said creasing slides, pressing means to permanently crease said folded label in one pressing operation, said pressing means including a pair of elongated stationary members being heated at their front undersurfaces, said stationary members having longitudinally disposed conveying channels on their undersurfaces, each said channel being longer than the length of an individual label, said channels defining depending lips along the inner edges of said stationary members, a pair of parallel presser bars disposed below said stationary members and being adapted to move upwardly at predetermined intervals so as to press a folded label against the heated undersurfaces of said stationary members, and jaw means adapted to reciprocate between said stationary members and adapted to receive a folded label from said folding mechanism and carry it into the pressing mechanism so that the folded ends of said label lie between the heated undersurfaces of the stationary members and the presser bars, pressure means disposed both above and below said presser bars adapted to force said presser bars tightly against said stationary members, said presser bars and said depending lips cooperating to grip a pressed label therebetween, said jaw means further adapted to convey said pressed label between said stationary members and said presser bars in such a manner that the folded ends of said pressed label move freely in said conveying channels, and said strip feeding means, said knife mechanism, said transfer means, said folding mechanism, and said pressing mechanism all operating in timed relation to each other.

References Cited in the file of this patent
UNITED STATES PATENTS

| | | |
|---|---|---|
| 1,958,096 | Pipenbing et al. | May 8, 1934 |
| 2,204,189 | Rosenthol | June 11, 1940 |
| 2,680,612 | Hubelmeyer | June 8, 1954 |